United States Patent [19]

Hennings et al.

[11] Patent Number: 5,009,876
[45] Date of Patent: Apr. 23, 1991

[54] METHOD OF MANUFACTURING BARIUM TITANATE BATIO$_3$

[75] Inventors: Detlev F. K. Hennings; Herbert J. Schreinemacher, both of Aachen, Fed. Rep. of Germany

[73] Assignee: U.S. Philips Corp., New York, N.Y.

[21] Appl. No.: 309,467

[22] Filed: Feb. 10, 1989

Related U.S. Application Data

[63] Continuation of Ser. No. 105,066, Oct. 5, 1987, abandoned.

[30] Foreign Application Priority Data

Oct. 16, 1986 [DE] Fed. Rep. of Germany ....... 3635532

[51] Int. Cl.$^5$ ............................................. C01G 23/00
[52] U.S. Cl. ..................................... 423/598; 423/609
[58] Field of Search ................... 423/160, 178, 84, 85, 423/71, 583, 598, 609; 501/136; 106/299

[56] References Cited

U.S. PATENT DOCUMENTS

| | | | |
|---|---|---|---|
| 2,758,911 | 8/1956 | Lynd et al. | 423/598 |
| 4,020,152 | 4/1977 | Heitz | 106/137 |
| 4,537,865 | 8/1985 | Okabe et al. | 501/135 |
| 4,670,243 | 6/1987 | Wilson et al. | 423/598 |

FOREIGN PATENT DOCUMENTS

| | | |
|---|---|---|
| 52-8098 | 2/1954 | Belgium . |
| 1014972 | 8/1958 | Fed. Rep. of Germany . |
| 2570373 | 3/1986 | France . |

OTHER PUBLICATIONS

Chemical Abstracts, vol. 68 (1968) 8826Y.
Kutty et al., Materials Letters, EPR Study on the Role of MN in Enhancing PTC of BaTiO$_3$, 4/1985, Nos. 5-6, pp. 195-199.
Van Nostrand's Scientific Encyclopedia, 4th ed., D. Van Nostrand Company, N.J.
Clabaugh et al., Journal of Research of the National Bureau of Standards, vol. 56, No. 5, 1956, "Preparation of Barium Titanyl Oxalate Tetrahydrate for Conversion to Barium Titanate of High Purity", pp. 289-291.

*Primary Examiner*—Theodore Morris
*Assistant Examiner*—Ed Squillante
*Attorney, Agent, or Firm*—Ernestine C. Bartlett

[57] ABSTRACT

A method of manufacturing barium titanate (BaTiO$_3$) (BaTiO(C$_2$O$_4$)$_2$·4H$_2$O), is by pyrolysis of barium titanyl oxalate, an provided in which aqueous solution of barium chloride (BaCl$_2$) is added dropwise while stirring vigorously to an aqueous solution comprising a mixture of oxalic acid (H$_2$C$_2$O$_4$) and titanium oxychloride (TiOCl$_2$) having a temperature in the range from 20° to 60° C. to form barium titanyl oxalate, the resultant precipitate being calcined at a temperature in the range from 960° to 1200° C.

13 Claims, 1 Drawing Sheet

METHOD OF MANUFACTURING BARIUM TITANATE BATIO₃

This is a continuation of application Ser. No. 105,066, filed Oct. 5, 1987, now abandoned.

FIELD OF THE INVENTION

The invention relates to a method of manufacturing barium titanate ($BaTiO_3$) by pyrolysis of barium titanyl oxalate $BaTiO(C_2O_4)_2$.

BACKGROUND OF THE INVENTION

It is known that barium titanate can only be manufactured by calcining the starting materials $BaCO_3$ and $TiO_2$ and also by pyrolysis of metalloorganic complex salts such as barium titanyl oxalate (BTO) or barium titanyl citrate.

According to a method known from J. Res. Natl. Bur. Stand. (1956) Res. Paper No. 2677, pp. 289 to 291 barium titanyl oxalate $BaTiO(C_2O_4)_2 \cdot 4 H_2O$ can be precipitated from aqueous solutions of titanium tetrachloride ($TiCl_4$), barium chloride($BaCl_2$) and oxalic acid($H_2C_2O_4$).

In the known process the aqueous solution of $TiCl_4$ and $BaCl_2$ is added dropwise to an aqueous $H_2C_2O_4$ solution having a temperature of $\approx 80°$ C. while stirring vigorously. In order to obtain a stoichiometrically well-defined final product of the composition $BaTiO(C_2O_4)_2 \cdot 4 H_2O$, the quantities used must be such that there is a barium excess of $\approx 1$ mol. % and an oxalic acid excess of $\approx 10$ mol. %, both relative to the molar quantity of titanate.

In this case the precipitate is of a typical)) ((coarse crystalline form with particle sizes in the range from $\approx 15$ to 70 $\mu$m. When the specifications are adhered to, the barium/titanate ratio of the powders manufactured according to the known method is from 1:1 to 1:1.01.

When the barium titanyl oxalate is calcined in an oxidizing atmosphere, for example in air, at a temperature of 1000° C., coarse grained $BaTiO_3$ aggregates having a grain size from 10 to 50 $\mu$m are obtained. The $BaTiO_3$ primary particles which make up the aggregates exhibit a grain size distribution in the range from 0.3 to 1.5 $\mu$m. At higher calcination temperatures the primary particles exhibit a substantial grain growth.

It is known that the shape and the size of the aggregates are the all-important factors with respect to the grindability and that the shape and the size of the primary particles are the decisive factors with respect to the sinterability and chemical reactivity with additives of any type.

It is an object of the invention to provide $BaTiO_3$ powders which relative to the known $BaTiO_3$ powders exhibit a smaller sintering interval and hence an improved sinterability; which exhibit an improved reactivity with additives which are added to ceramic masses on the basis of $BaTiO_3$ to obtain sintering products having desired technical properties; and which can more readily be ground, such that a desired grain size and grain size distribution can be obtained.

SUMMARY OF THE INVENTION

This object is achieved according to the invention, in that to form barium titanyl oxalate ($BaTiO(C_2O_4)_2 \cdot 4H_2O$) an aqueous solution of barium chloride ($BaCl_2$) is added dropwise to an aqueous solution comprising a mixture of oxalic acid ($H_2C_2O_4$) and titanium oxychloride ($TiOCl_2$) at a temperature in the range from 20° to 60° C. while stirring vigorously, and the precipitate is calcined at a temperature in the range from 900° to 1300° C.

This aqueous solution comprising a mixture of oxalic acid and titanium oxychloride has a temperature in the range from 20° to 60° C., preferably of 55° C. At temperatures over 60° C. aqueous 55° C. At temperatures over 60° C. aqueous solutions of oxalic acid and titanium oxychloride are stable only for a short period of time (less than 30 minutes at a temperature of 80° C.). Consequently, temperatures higher than 60° C. must be avoided because they lead to an undesirably high degree of $TiO_2$ precipitation in the receptacle. However, when the temperatures are too low the speed of the precipitation process is strongly reduced. Consequently, a suitable precipitation temperature is in the range from 20° to 60° C. and preferably 50° to 60° C., the optimum temperature being approximately 55° C.

According to advantageous embodiments of the inventive method, the process parameters (concentration of the starting solutions and temperature) are selected so that the barium:titanate ratio of the precipitated barium titanyl oxalate is reproducibly in the range of from 1:1.015 to 1:1.025. $BaTiO_3$ having such a Ba/Ti ratio is advantageously used for the manufacture of resistors having a positive temperature coefficient of resistance, which resistors are sintered, as is known, with a titanium excess of this order of magnitude to produce small quantities of a titanium-enriched liquid phase.

Particularly the following advantages can be obtained with the method according to the invention:

Unlike the crystallites manufactured according to the known method, the barium titanyl oxalate crystallites manufactured according to the inventive method only have dimensions in the range from 0.5 to 1 $\mu$m. Very often deposition of these crystallites leads to the formation of a cluster, i.e. the formation of agglomerates which have a smaller size than the agglomerates formed according to the known method, typically their size ranges from 5 to 15 $\mu$m.

When the barium titanyl oxalate manufactured according to the inventive method is calcined at a temperature of $\approx 1000°$ C. for 4 hours much smaller $BaTiO_3$ aggregates (grain size in the range from 3 $\mu$m to 10 $\mu$m) are obtained with much smaller $BaTiO_3$ primary particles (grain size in the range from 0.1 to 0.4 $\mu$m) than in the case of the known method. In contrast to the $BaTiO_3$ powders manufactured according to the known method, those manufactured according to the inventive method exhibit only a very small grain growth as the temperature rises. For example, when the barium titanyl oxalate manufactured according to the known method is calcined at a temperature of 1100° C. for 4 hours, $BaTiO_3$ primary particles are formed having a grain size in the range from 0.5 $\mu$m to 2.5 $\mu$m, whereas in the inventive method and under the same conditions of calcination $BaTiO_3$ primary particles are obtained having a grain size in the range from only 0.2 $\mu$m to 0.5 $\mu$m.

The grindability of the $BaTiO_3$ powders manufactured according to the inventive method has been considerably improved in comparison with the grindability of these powders manufactured according to the known method. After grinding in an attrition mill for 30 minutes and under the conditions as will be described hereinafter under step 6 of the example, an average grain size of $d_{50\%} = 1.1$ $\mu$m is obtained for the $BaTiO_3$ powders manufactured according to the known method, whereas the powders manufactured according to the inventive method have an average grain size of $d_{50\%}=0.7$ μm.

The grain sizes can be determined in a sedigraph, for example, in an aqueous suspension containing 0.1% by weight of $Na_2P_2O_7.10\ H_2O$.

DESCRIPTION OF THE DRAWING

FIG. 1 shows the cumulative mass content (M) in relation to the grain size (K) of the $BaTiO_3$ powders manufactured according to the inventive method (curve A) in comparison with the powders manufactured according to the known method (curve B).

Figure 1:
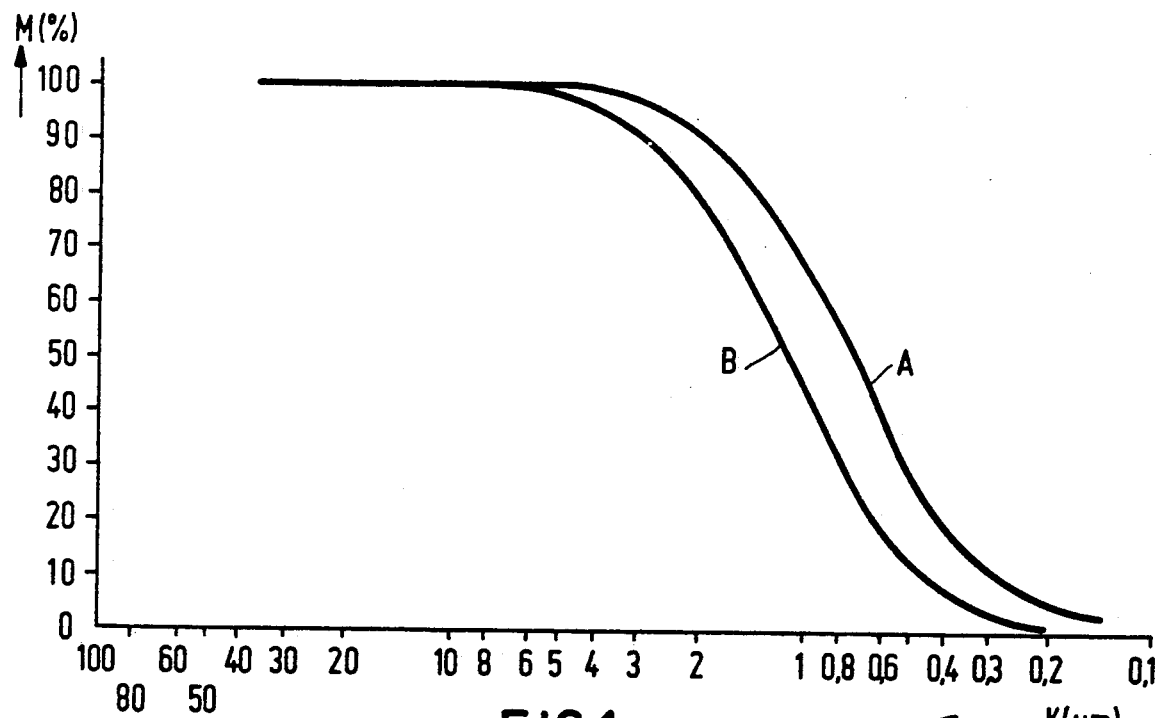
FIGS. 1 and 2 are comparative graphs which compare properties of barium titanate powders obtained by the method of this invention with properties of barium titanate powders obtained by the known method referred to hereinabove.
Figure 2:
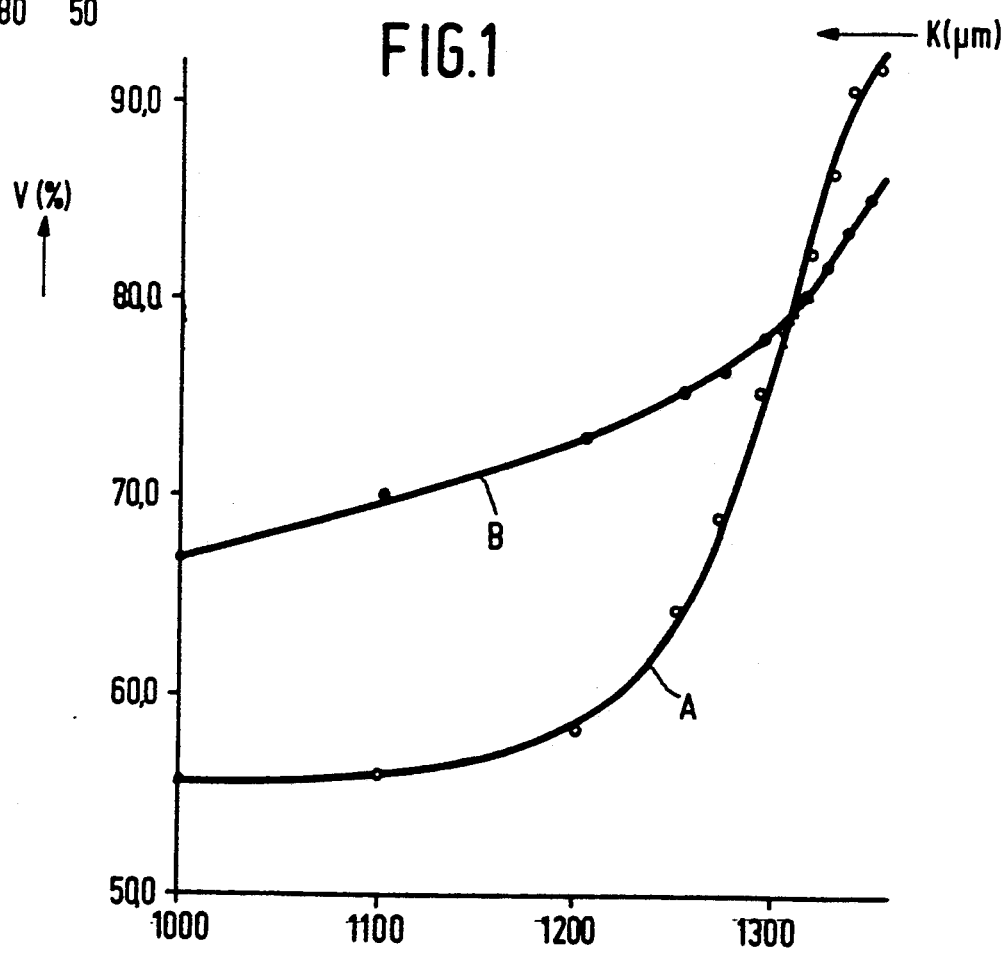

In comparison with the $BaTiO_3$ powders manufactured according to the known method, the powders manufactured according to the inventive method exhibit an improved sinterability. This manifests itself in the shrinkage characteristics of molding manufactured from unground $BaTiO_3$ powders. The shrinkage curves show that compacts from powders manufactured according to the inventive method exhibit a much smaller sintering interval than those which are manufactured according to the known method, and which are sintered under the same conditions as the compacts manufactured according to the inventive method of this application. For example $BaTiO_3$ compacts manufactured according to the inventive method from unground $BaTiO_3$ powders only start shrinking at temperatures of from 1200° C., and they attain a higher density (curve A) at temperatures of from 1300° C. than $BaTiO_3$ compacts (curve B) manufactured according to the known method. Reference is made to FIG. 2 in which the densification (V) is given as a percentage of the theoretical density.

As a result of the increased sinter activity and the larger specific surface of the powders manufactured according to the inventive method, a higher chemical reactivity of these powders with additives is to be expected. A comparison between the powders manufactured according to the inventive method and those manufactured according to the known method is shown in the following table:

TABLE

| $BaTiO_3$ powders, manufactured according to: | | |
|---|---|---|
| | (1) the present state of the art | (2) the method of the invention |
| Ba/Ti-ratio | 1:1 to 1:1.01 | 1:1.015 to 1:1.025 |
| Barium titanyl oxalate crystallite size | 15 to 70 μm | 0.5 to 1 μm |
| Barium titanyl oxalate agglomerate size | | 5 to 15 μm |
| $BaTiO_3$ primary particle size (calcined at 1000° C.) | 0.3 to 1.5 μm | 0.1 to 0.4 μm |
| $BaTiO_3$ aggregate size (calcined at 1000° C.) | 10 to 50 μm | 3 to 10 μm |
| $BaTiO_3$ primary particle size (calcined at 1100° C.) | 0.5 to 2.5 μm | 0.2 to 0.5 μm |
| Specific surface | | |
| calcined at 1000° C. | 0.9 m²/g | 1.8 m²/g |
| calcined at 1100° C. | 0.3 m²/g | 1.7 m²/g |
| 2h in attrition mill, calcination at 1000° C. | 6.5 m²/g | 8.9 m²/g |
| Average particle size: | 0.8 μm | 0.54 μm |

TABLE-continued

| $BaTiO_3$ powders, manufactured according to: | | |
|---|---|---|
| | (1) the present state of the art | (2) the method of the invention |
| ($d_{50}$ value in sedigram) 2h in attrition mill, calcination at 1100° C. Densification at 1340° C.: (heating 2.5° C./min) Greenbody precompressed (3200 bar) | 85% | 92% |

DETAILED DESCRIPTION OF PREFERRED EMBODIMENTS

Example

By way of example a description is given of the manufacture of $BaTiO_3$ powders:

1. For the manufacture of barium titanyl oxalate (BTO) commercially available reagents (degree of purity "p.A") were used: $TiOCl_2$ with 0.668 mol of Ti in an aqueous solution comprising $BaCl_2.2H_2O\ H_2C_2O_4.2\text{-}H_2O$ in demineralized.

2. The manufacture of the (a) $TiOCl_2$-solution: 400 ml of $TiCl_4$ are added dropwise to 600 ml of water while stirring at a temperature range from 5° to 30° C. Subsequently the solution is diluted to 2000 ml.

(b) $BaCl_2$-solution: The solution was manufactured with 1% of Ba excess relative to the Ti-content (0.668 mol per formulation), (i.e.) 1.01.0.668 mol of $BaCl_2.2H_2O = 164.81$ g $BaCl_2.2H_2O$ are dissolved in 1600 ml of water.

(c) $H_2C_2O_4$ solution: The solution was manufactured with an excess of 10 mol.% of oxalic acid relative to the Ti content, i.e. 1.1.2 nTi=1.1.2.0.668 mol= 185.27 g of oxalic acid, $H_2C_2O_4.2\ H_2O$, are dissovled in 1000 ml of water at a temperature of 55° C.

(d) Mixing the solutions: The quantity of $TiOCl_2$ solution containing 0.668 mol of Ti is added to the $H_2C_2O_4$ solution, while stirring.

3. The quantity of $BaCl_2$ solution which is manufactured as described in step 2 above is added dropwise to the aqueous solution comprising a mixture of $TiOCl_2$ and $H_2C_2O_4$ while stirring vigorously at a temperature of 55° C. During the addition a fine-crystalline precipitate of barium titanyl oxalate ($BaTiO(C_2O_4)_2.4H_2O$), having a small excess of $TiO_2$ (1.5–2.5 mol %), is formed after a short period of time, which excess is filtered out and from which residual are removed by washing it several times with demineralized water.

The barium titanyl oxalate precipitate of step 3 above is dried in air for 20 hours at a temperature of 50° C.

The barium titanyl oxalate of step 4 is then calcined in a chamber furnace in an air stream at a temperature between 1000° and 1200° C., preferably at a temperature of 1100° C. In this way a white $BaTiO_3$ powder of the above-described morphology is formed.

60 g of barium titanate $BaTiO_3$ thus produced are slurried in 130 ml of water and mixed with 0.6 g of ammonium oxalate $(NH_4)_2C_2O_4.1H_2O$ to prevent the Ba ions from being washed out in the grinding process.

To this suspension 600 g of corundum grinding balls having a diameter of approximately 1.5 mm are added. The suspension is ground in a commercially available attrition mill at a speed of 500 U/min for preferably 45 min. After grinding, the suspension is dried and any excessive ammonium oxalate is removed by heating at a temperature of approximately 400° C.

What is claimed is:

1. A method of manufacturing barium titanate by pyrolysis of barium titanyl oxalate which consists essentially of adding an aqueous solution of barium chloride to an aqueous solution comprising a mixture of oxalic acid and titanium oxychloride at a temperature in the range from 20° C. to 60° C., with agitation, to produce a precipitate of barium titanyl oxalate having a barium to titanium ratio in the range of 1:1.015 to 1:1.025; and calcining the resultant precipitate at a temperature in the range of 900° to 1300° C. for a time period effective to form barium titanate, said barium titanate having improved grindability, increased sinterability and comprising primary particles having a smaller grain size when compared to barium titanate obtained when aqueous solutions of barium chloride, titanium chloride and oxalic acid are reacted and the barium to titanium ratio is not within said 1:1.015 to 1:1.025 range.

2. A method of manufacturing barium titanate by pyrolysis of barium titanyl oxalate which consists essentially of adding an aqueous solution of barium chloride to an aqueous solution comprising a mixture of oxalic acid and titanium oxychloride at a temperature in the range from 20° C. to 60° C., with agitation, to produce a precipitate of barium titanyl oxalate having a barium to titanium ratio in the range of 1:1.015 to 1:1.025; and calcining the resultant precipitate at a temperature of about 1000° C. for a time period effective to form barium titanate comprising primary particles having a grain size within the range of 0.1 to 0.4 $\mu m$.

3. A method as claimed in claim 1, wherein a titanium oxychloride solution containing about 0.668 mol of titanium is used, said titanium oxychloride solution being obtained by dropwise addition of about 400 ml of titanium tetrachloride to about 600 ml of water at a temperature of $\leq 30°$ C., with stirring, after which the solution of said titanium oxychloride is diluted with water to about 2000 ml.

4. A method as claimed in claim 1, wherein about 185.27 g of oxalic acid are dissolved in about 1000 ml of $H_2O$ having a temperature of about 55° C.

5. A method as claimed in claim 1, wherein about 164.81 g of barium chloride are dissolved in about 1600 ml of $H_2O$.

6. A method as claimed in claim 1, wherein the mixture of oxalic acid and titanium oxychloride is prepared by adding a titanium oxychloride solution to an oxalic acid solution while stirring.

7. A method as claimed in claim 1, wherein the aqueous barium chloride solution is added dropwise to the aqueous solution comprising a mixture of titanium oxychloride and oxalic acid at a temperature of about 55° C. while stirring vigorously to form a barium titanyl oxalate precipitate having a $TiO_2$ excess in the range from 1.5 to 2.5 mol %.

8. A method as claimed in claim 7, wherein residual chloride ions are washed from said barium titanyl oxalate precipitate which is then dried in air for 20 hours at a temperature of about 50° C. to form a barium titanyl oxalate powder.

9. A method as claimed in claim 8, wherein the barium titanyl oxalate powder is calcined in a chamber furnace at a temperature in the range from 1000° C. to 1200° C. in an oxidizing atmosphere to form barium titanate.

10. A method of manufacturing barium titanate which consists essentially of:
    (a) adding an aqueous solution of barium chloride dropwise to an aqueous solution of a mixture of oxalic acid and titanium oxychloride at a temperature in the range of 20° C. to 60° C., said aqueous solution of a mixture of oxalic acid and titanium oxychloride being agitated during said dropwise addition;
    (b) forming a crystalline precipitate of barium titanyl oxalate having a barium to titanium ratio in the range of 1:1.015 to 1:1.025; and
    (c) subjecting said crystalline precipitate to an elevated temperature of about 900° to 1300° C. in an oxidizing atmosphere to form barium titanate, the barium titanate comprising primary particles having a grain size within the range of 0.1 to 0.4 $\mu m$ and 0.2 to 0.5 $\mu m$ when said precipitate is calcined for four hours at a temperature of about 1000° C. and about 1100° C., respectively,
    said barium titanate having improved grindability and increased sinterability when compared to barium titanate obtained when aqueous solutions of barium chloride, titanium chloride and oxalic acid are reacted and the barium to titanium ratio is not within said 1:1.015 to 1:1.025 range.

11. A method as claimed in claim 10 wherein the precipitate is ground to produce a powder having an average grain size of about 0.7 $\mu m$.

12. A method as claimed in claim 10 wherein the barium titanyl oxalate precipitate is calcined at 1000° C. for four hours and yields barium titanate comprising primary particles having a grain size of about 0.1 to 0.4 $\mu m$.

13. A method as claimed in claim 10 wherein the barium titanyl oxalate precipitate is calcined at 1100° C. for four hours and yields barium titanate comprising primary particles having a grain size of about 0.2 to 0.5 $\mu m$.

* * * * *